United States Patent
Zhou et al.

(10) Patent No.: US 10,611,246 B2
(45) Date of Patent: Apr. 7, 2020

(54) GATE DRIVER WITH TEMPERATURE COMPENSATED TURN-OFF

(71) Applicant: Ford Global Technologies, LLC, Dearborn, MI (US)

(72) Inventors: Yan Zhou, Canton, MI (US); Lihua Chen, Farmington Hills, MI (US); Shuitao Yang, Dearborn Heights, MI (US); Fan Xu, Novi, MI (US); Mohammed Khorshed Alam, Canton, MI (US); Baoming Ge, Okemos, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 291 days.

(21) Appl. No.: 15/472,399

(22) Filed: Mar. 29, 2017

(65) Prior Publication Data

US 2018/0281600 A1 Oct. 4, 2018

(51) Int. Cl.
| | | |
|---|---|---|
| *B60L 1/00* | (2006.01) | |
| *B60L 3/00* | (2019.01) | |
| *H02G 3/00* | (2006.01) | |
| *B60L 3/04* | (2006.01) | |
| *B60L 53/14* | (2019.01) | |

(52) U.S. Cl.
CPC .............. *B60L 3/04* (2013.01); *B60L 53/14* (2019.02); *B60L 2210/14* (2013.01); *B60L 2210/40* (2013.01); *Y02T 10/7005* (2013.01); *Y02T 10/7241* (2013.01); *Y10S 903/904* (2013.01)

(58) Field of Classification Search
CPC ........ B60L 3/04; B60L 53/14; B60L 2210/14; B60L 2210/40; B60L 3/003; B60L 3/00; Y02T 10/7241; Y02T 10/7005; Y10S 903/904
See application file for complete search history.

(56) References Cited

U.S. PATENT DOCUMENTS

| | | | |
|---|---|---|---|
| 6,215,634 B1 * | 4/2001 | Terasawa | H02M 3/33592 327/310 |
| 9,030,054 B2 | 5/2015 | Jacobson et al. | |
| 2013/0083442 A1 * | 4/2013 | Hiyama | H03K 17/0828 361/93.7 |
| 2016/0020688 A1 * | 1/2016 | Osanai | H03K 17/795 327/109 |
| 2016/0099665 A1 | 4/2016 | Chen et al. | |
| 2018/0269867 A1 * | 9/2018 | Terashima | H03K 17/14 |

* cited by examiner

*Primary Examiner* — Hal Kaplan
*Assistant Examiner* — Rasem Mourad
(74) *Attorney, Agent, or Firm* — David Kelley; Brooks Kushman P.C.

(57) ABSTRACT

A vehicle powertrain includes a monolithically integrated load switch, mirror switch, and temperature array, and a gate driver. The gate driver includes a first comparator configured to filter a current level of the mirror switch, and a second comparator configured to provide a reference to the first comparator based on temperature array output such that a gate discharge rate of the switch, enabled by the first comparator, varies proportionally with a temperature adjusted filtered current level.

18 Claims, 6 Drawing Sheets

GATE DRIVER WITH TEMPERATURE COMPENSATED TURN-OFF

TECHNICAL FIELD

This application is generally related to a gate driver for a solid state switch in which a temperature compensated current mirror signal from the switch is used to adjust a gate current to change a rate of turn-off.

BACKGROUND

Electrified vehicles including hybrid-electric vehicles (HEVs), plugin hybrid electric vehicles (PHEVs), and battery electric vehicles (BEVs) rely on a traction battery to provide power to a traction motor for propulsion and a power inverter therebetween to convert direct current (DC) power to alternating current (AC) power. The typical AC traction motor is a 3-phase motor that may be powered by 3 sinusoidal signals each driven with 120 degrees phase separation. The traction battery is configured to operate in a particular voltage range and provide a maximum current. The traction battery is alternatively referred to as a high-voltage battery.

Also, many electrified vehicles include a DC-DC converter, also referred to as a variable voltage converter (VVC), to convert the voltage of the traction battery to an operational voltage level of the electric machine. The electric machine, which may include a traction motor, may require a high voltage and high current. Due to the voltage, current and switching requirements, a solid state switch such as an Insulated Gate Bipolar junction Transistor (IGBT) is typically used to generate the signals in the power inverter and the VVC.

SUMMARY

A vehicle powertrain includes a monolithically integrated load switch, mirror switch, and temperature array, and a gate driver. The gate driver includes a first comparator configured to filter a current level of the mirror switch, and a second comparator configured to provide a reference to the first comparator based on temperature array output such that a gate discharge rate of the switch, enabled by the first comparator, varies proportionally with a temperature adjusted filtered current level.

A method of controlling a switch includes filtering a mirror current, varying a reference voltage, and varying a discharge rate of a gate of the switch. The mirror current is filtered indicative of a current flow through the switch. The reference voltage is varied proportionally with a junction temperature of the switch. The discharge rate of the gate of the switch is varied based on an open loop comparison of the filtered mirror current with the varied reference voltage such that the discharge rate decreases upon reaching a breakdown threshold of the switch.

A vehicle includes a power converter and a gate driver. The power converter includes a power switch. The gate driver configured to, in response to a differential voltage of a filtered current level of a mirror switch of the power switch exceeding a temperature dependent reference voltage, reduce a rate of discharge of a gate of the power switch such that a current to a load coupled with the power switch does not exceed a threshold that varies with temperature.

DETAILED DESCRIPTION

Figure 1:
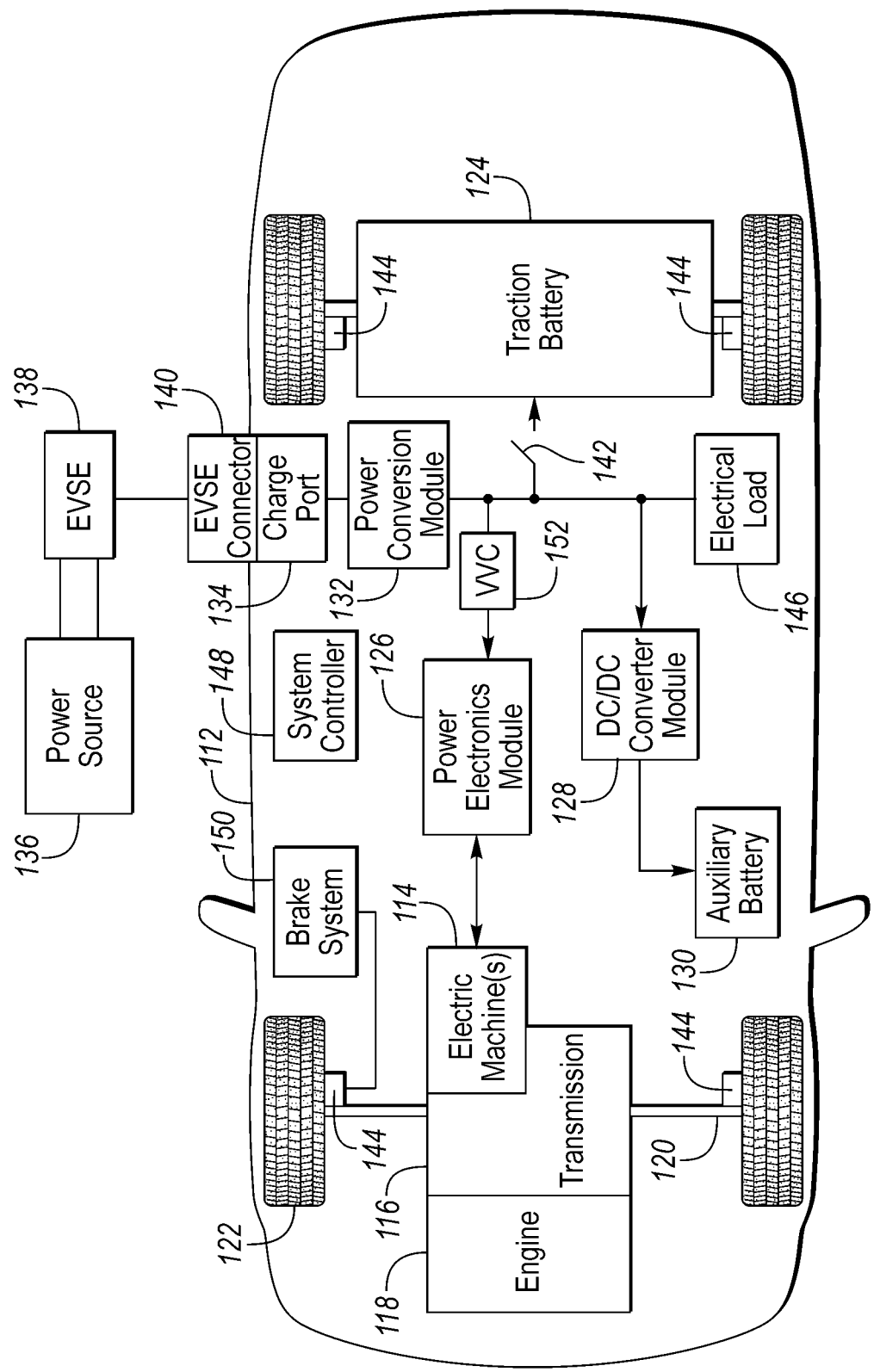
FIG. 1 is a diagram of a hybrid vehicle illustrating typical drivetrain and energy storage components with a variable voltage converter and power inverter therebetween.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

When considering an xEV such as an HEV, PHEV, or BEV, operating conditions may vary greatly over the life of the xEV. For example, a power device operating in a powertrain system such as a transistor in a converter, including a DC-DC converter or a DC-AC converter may be operated over a wide temperature range, and thus the power device in the converter may have a junction temperature (Tj) that varies from an extreme low temperature (e.g., −40° C.) to a very high temperature (e.g. 150° C.). As the operating voltage varies, so does a breakdown voltage (VB) of the power device as VB is a function of Tj. Here, a circuit is disclosed that automatically adjusts to the change in device junction temperature to provide increased protection from reverse voltage breakdown of the component. Generally room temperature is 25° C. and a low temperature is any temperature less than room temperature, while a very low temperature is any temperature less than 0° C. (i.e., the temperature that water freezes). Typically, the breakdown voltage of the switch is measured at room temperature (i.e., 25° C.). A breakdown of an IGBT may be specified as a breakdown voltage from collector to emitter with the gate shorted to the emitter (BVces) while limiting the condition associated with the specification. For example, the specification may limit the breakdown conditions to a temperature of 25° C. while a collector current is 1 mA and Vge is 0V. However, during use in a harsh environment, the breakdown voltage BVces may drop by an additional 5% at −25° C. and an additional 7% at −50° C. Therefore, an electric module in a vehicle such as a DC-DC converter or a DC-AC converter may have voltage peaks that are under the breakdown voltage when the Tj is greater than room temperature but may exceed the breakdown voltage at low temperatures. The voltage peaks are based on a gate current magnitude, a rate of change of a current through the switch, and a magnitude of the current. Often the breakdown voltage of a switch is based on the circuit topology and manufacturing process. For a given current capacity, switches having higher breakdown voltages typically have higher costs, and in some instances switches with higher breakdown voltages are not available due to material limitations of the switch. A circuit designer using the switch often desires to operate the switch close to the breakdown voltage without exceeding it. Therefore, to meet the requirements and constraints of the switches, a system is typically designed using a minimum breakdown voltage across the entire temperature range of operation. However, often the switches are only operated at the very low or extreme low temperatures (e.g., −50, −40, −35, −25, −15, or −5) for a brief period time, after which the components heat up (either internally or via the use of an external heater) and the breakdown voltage increases. To reduce costs and improve efficiencies, methods and circuits are disclosed to adjust a gate current of a switch, based on a temperature of the switch, to proportionally adjust a load current when the switch is operated at low and very low temperatures.

Generally, solid state devices (SSD), such as Insulated Gate Bipolar junction Transistors (IGBTs), Metal Oxide Semiconductor Field Effect Transistors (MOSFETs), or Bipolar Junction Transistors (BJTs) are widely used in a variety of automotive and industrial applications, such as electric motor drives, power inverters, DC-DC converters, and power modules. Operation of an IGBT and a MOSFET is voltage controlled, in which the operation is based on a voltage applied to a gate of the IGBT or MOSFET, while operation of a BJT is current controlled, in which the operation is based on a current applied to a base of the BJT. Here, the use of an IGBT will be discussed, however the structure and methods may be applicable to other SSDs, for example, an insulated gate SSD includes both an IGBT and a MOSFET. Operation of an IGBT is controlled by a gate voltage supplied by a gate driver. Conventional gate drivers are typically based on a voltage, greater than a threshold voltage, applied to the IGBT gate with a current limiting resistor, which typically consists of a switchable voltage source and a gate resistor. A low gate resistance would lead to a fast switching speed and low switching loss, but may also cause higher stresses on the semiconductor devices, e.g. over-voltage stresses. Therefore, the gate resistance is selected to seek a compromise between switching loss, switching delay, and stresses. When turning off an IGBT, the gate resistor reduces the current flowing from the gate and thereby increases a shutoff time of the IGBT. Also, the IGBT may not have equal losses during turn-on and turn-off, therefore the use of a gate driver that provides a turn-on resistance that is different from the turn-off resistance may be used.

FIG. 1 depicts an electrified vehicle 112 that may be referred to as a plug-in hybrid-electric vehicle (PHEV). A plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and deceleration capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present. In other configurations, the electrified vehicle 112 may be a full hybrid-electric vehicle (FHEV) without plug-in capability.

A traction battery or battery pack 124 stores energy that can be used by the electric machines 114. The vehicle battery pack 124 may provide a high voltage direct current (DC) output. The traction battery 124 may be electrically coupled to one or more power electronics modules 126. One or more contactors 142 may isolate the traction battery 124 from other components when opened and connect the traction battery 124 to other components when closed. The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

The vehicle 112 may include a variable-voltage converter (VVC) 152 electrically coupled between the traction battery 124 and the power electronics module 126. The VVC 152 may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a DC/DC converter module 128 that converts the high voltage DC output of the traction battery 124 to a low voltage DC supply that is compatible with low-voltage vehicle loads. An output of the DC/DC converter module 128 may be electrically coupled to an auxiliary battery 130 (e.g., 12V battery) for charging the auxiliary battery 130. The low-voltage systems may be electrically coupled to the auxiliary battery 130. One or more electrical loads 146 may be coupled to the high-voltage bus. The electrical loads 146 may have an associated controller that operates and controls the electrical loads 146 when appropriate. Examples of electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 112. A vehicle system controller (VSC) 148 may be present to coordinate the operation of the various components.

Figure 2:
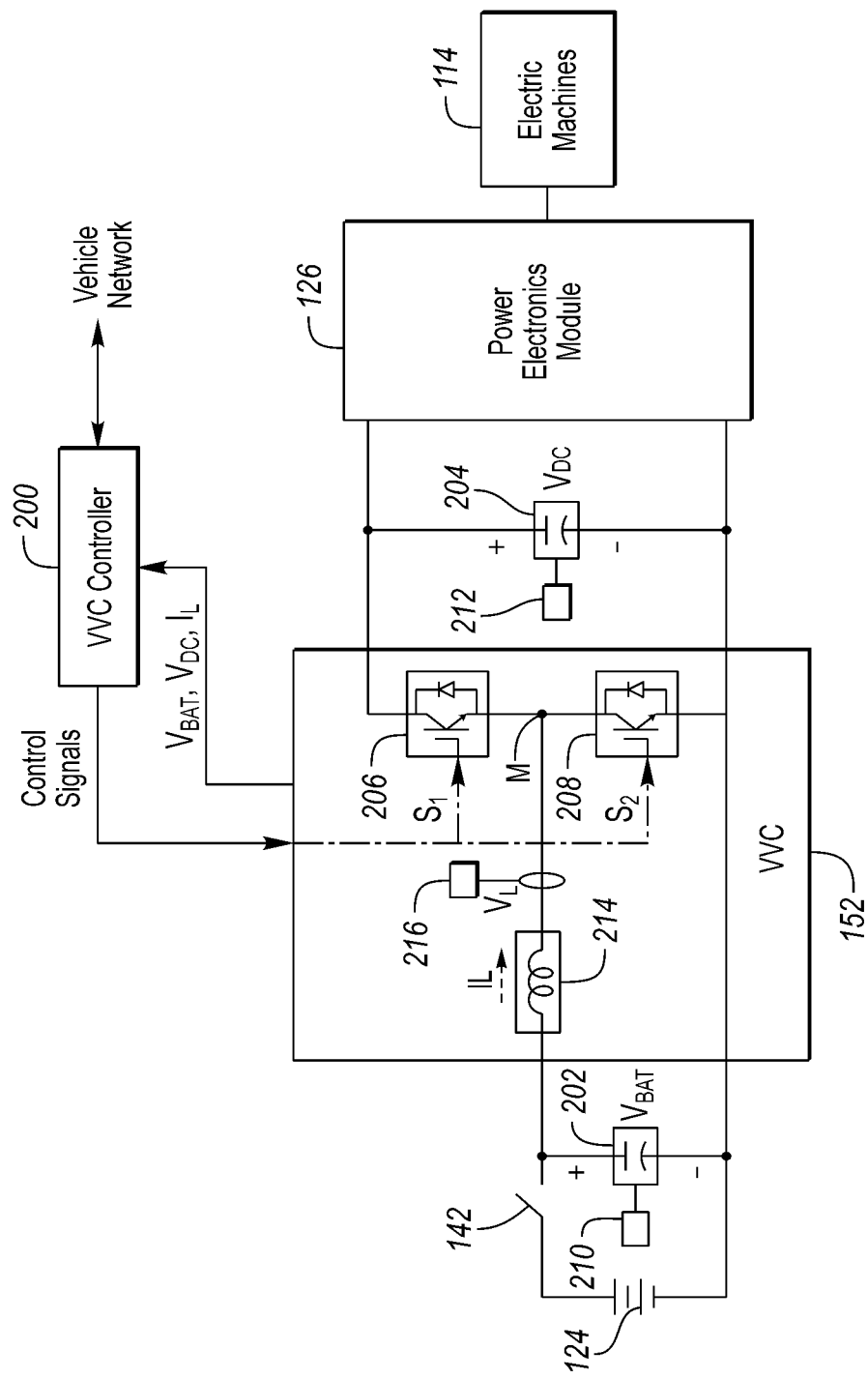
FIG. 2 is a schematic diagram of a vehicular variable voltage converter.

FIG. 2 depicts a diagram of a VVC 152 that is configured as a boost converter. The VVC 152 may include input terminals that may be coupled to terminals of the traction battery 124 through the contactors 142. The VVC 152 may include output terminals coupled to terminals of the power electronics module 126. The VVC 152 may be operated to cause a voltage at the output terminals to be greater than a voltage at the input terminals. The vehicle 112 may include a VVC controller 200 that monitors and controls electrical parameters (e.g., voltage and current) at various locations within the VVC 152. In some configurations, the VVC controller 200 may be included as part of the VVC 152. The VVC controller 200 may determine an output voltage reference, V. The VVC controller 200 may determine, based on the electrical parameters and the voltage reference, $V_{dc}^*$, a control signal sufficient to cause the VVC 152 to achieve the desired output voltage. In some configurations, the control signal may be implemented as a pulse-width modulated (PWM) signal in which a duty cycle of the PWM signal is varied. The control signal may be operated at a predetermined switching frequency. The VVC controller 200 may command the VVC 152 to provide the desired output voltage using the control signal. The particular control signal at which the VVC 152 is operated may be directly related to the amount of voltage boost to be provided by the VVC 152.

The output voltage of the VVC 152 may be controlled to achieve a desired reference voltage. In some configurations, the VVC 152 may be a boost converter. In a boost converter configuration in which the VVC controller 200 controls the duty cycle, the ideal relationship between the input voltage $V_{in}$ and the output voltage $V_{out}$ and the duty cycle D may be illustrated using the following equation:

$$V_{out} = \frac{V_{in}}{(1-D)} \quad 1)$$

The desired duty cycle, D, may be determined by measuring the input voltage (e.g., traction battery voltage) and setting the output voltage to the reference voltage. The VVC 152 may be a buck converter that reduces the voltage from input to output. In a buck configuration, a different expression relating the input and output voltage to the duty cycle may be derived. In some configurations, the VVC 152 may be a buck-boost converter that may increase or decrease the input voltage. The control strategy described herein is not limited to a particular variable voltage converter topology.

With reference to FIG. 2, the VVC 152 may boost or "step up" the voltage potential of the electrical power provided by the traction battery 124. The traction battery 124 may provide high voltage (HV) DC power. In some configurations, the traction battery 124 may provide a voltage between 150 and 400 Volts. The contactor 142 may be electrically coupled in series between the traction battery 124 and the VVC 152. When the contactor 142 is closed, the HV DC power may be transferred from the traction battery 124 to the VVC 152. An input capacitor 202 may be electrically coupled in parallel to the traction battery 124. The input capacitor 202 may stabilize the bus voltage and reduce any voltage and current ripple. The VVC 152 may receive the HV DC power and boost or "step up" the voltage potential of the input voltage according to the duty cycle.

An output capacitor 204 may be electrically coupled between the output terminals of the VVC 152. The output capacitor 204 may stabilize the bus voltage and reduce voltage and current ripple at the output of the VVC 152.

Further with reference to FIG. 2, the VVC 152 may include a first switching device 206 and a second switching device 208 for boosting an input voltage to provide the boosted output voltage. The switching devices 206, 208 may be configured to selectively flow a current to an electrical load (e.g., power electronics module 126 and electric machines 114). Each switching device 206, 208 may be individually controlled by a gate drive circuit (not shown) of the VVC controller 200 and may include any type of controllable switch (e.g., an insulated gate bipolar transistor (IGBT) or field-effect transistor (FET)). The gate drive circuit may provide electrical signals to each of the switching devices 206, 208 that are based on the control signal (e.g., duty cycle of PWM control signal). A diode may be coupled across each of the switching devices 206, 208. The switching devices 206, 208 may each have an associated switching loss. The switching losses are those power losses that occur during state changes of the switching device (e.g., on/off and off/on transitions). The switching losses may be quantified by the current flowing through and the voltage across the switching device 206, 208 during the transition. The switching devices may also have associated conduction losses that occur when the device is switched on.

The vehicle system may include sensors for measuring electrical parameters of the VVC 152. A first voltage sensor 210 may be configured to measure the input voltage, (e.g., voltage of the battery 124), and provide a corresponding input signal ($V_{bat}$) to the VVC controller 200. In one or more embodiments, the first voltage sensor 210 may measure the voltage across the input capacitor 202, which corresponds to the battery voltage. A second voltage sensor 212 may measure the output voltage of the VVC 152 and provide a corresponding input signal ($V_{dc}$) to the VVC controller 200. In one or more embodiments, the second voltage sensor 212 may measure the voltage across the output capacitor 204, which corresponds to the DC bus voltage. The first voltage sensor 210 and the second voltage sensor 212 may include circuitry to scale the voltages to a level appropriate for the VVC controller 200. The VVC controller 200 may include circuitry to filter and digitize the signals from the first voltage sensor 210 and the second voltage sensor 212.

An input inductor 214, often referred to as a boost inductor, may be electrically coupled in series between the traction battery 124 and the switching devices 206, 208. The input inductor 214 may alternate between storing and releasing energy in the VVC 152 to enable the providing of the variable voltages and currents as VVC 152 output, and the achieving of the desired voltage boost. A current sensor 216 may measure the input current through the input inductor 214 and provide a corresponding current signal ($I_L$) to the VVC controller 200. The input current through the input inductor 214 may be a result of the voltage difference between the input and the output voltage of the VVC 152, the conducting time of the switching devices 206, 208, and the inductance L of the input inductor 214. The VVC controller 200 may include circuitry to scale, filter, and digitize the signal from the current sensor 216.

The VVC controller 200 may be programmed to control the output voltage of the VVC 152. The VVC controller 200 may receive input from the VVC 152 and other controllers via the vehicle network, and determine the control signals. The VVC controller 200 may monitor the input signals ($V_{bat}$, $V_{dc}$, $I_L$, $V_{dc}^*$) to determine the control signals. For example, the VVC controller 200 may provide control signals to the gate drive circuit that correspond to a duty cycle command. The gate drive circuit may then control each switching device 206, 208 based on the duty cycle command.

The control signals to the VVC 152 may be configured to drive the switching devices 206, 208 at a particular switching frequency. Within each cycle of the switching frequency, the switching devices 206, 208 may be operated at the specified duty cycle. The duty cycle defines the amount of time that the switching devices 206, 208 are in an on-state and an off-state. For example, a duty cycle of 100% may operate the switching devices 206, 208 in a continuous on-state with no turn off. A duty cycle of 0% may operate the switching devices 206, 208 in a continuous off-state with no turn on. A duty cycle of 50% may operate the switching devices 206, 208 in an on-state for half of the cycle and in an off-state for half of the cycle. The control signals for the two switches 206, 208 may be complementary. That is, the control signal sent to one of the switching devices (e.g., 206) may be an inverted version of the control signal sent to the other switching device (e.g., 208). The use of complementary control of the switching devices 206, 208 is desirable to avoid a shoot-through condition in which current flows directly through a high-side switching device 206 and a low-side switching device 208. The high-side switching device 206 is also called a pass device 206 and the low-side switching device 208 is also called a charging device 208.

Figure 5:
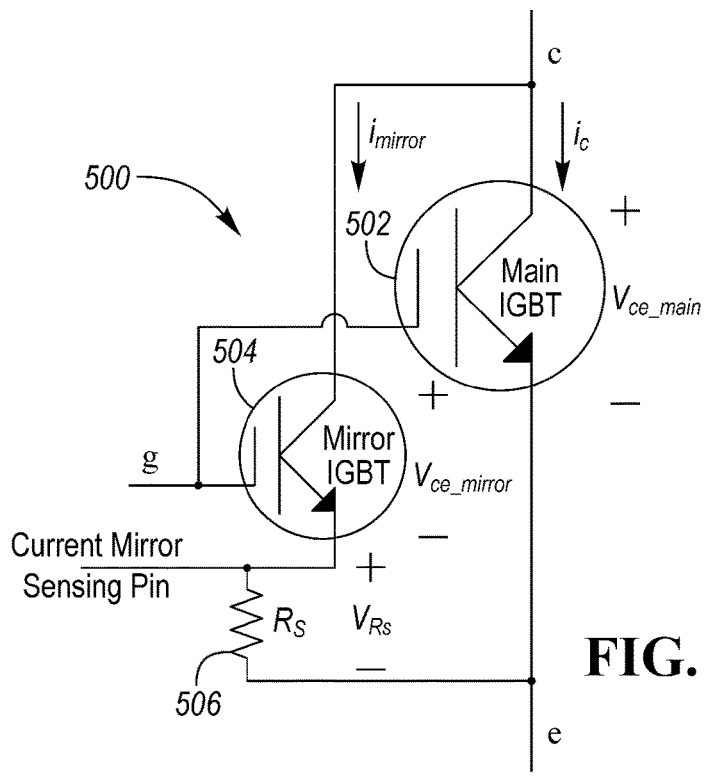
FIG. 5 is a schematic diagram of an insulated gate bipolar junction transistor with a current mirror and sense resistor.

The current that is controlled by the switching devices 206, 208 may include a ripple component that has a magnitude that varies with a magnitude of the current, and the duty cycle and switching frequency of the switching devices 206, 208. Relative to the input current, the worst case ripple current magnitude occurs during relatively high input current conditions. When the duty cycle is fixed, an increase in the inductor current causes an increase in magnitude of the ripple current. The magnitude of the ripple current is also related to the duty cycle. The highest magnitude ripple current occurs when the duty cycle equals 50%. The general relationship between the inductor ripple current magnitude and the duty cycle may be as shown in FIG. 5. Based on these facts, it may be beneficial to implement measures to reduce the ripple current magnitude under high current and mid-range duty cycle conditions.

When designing the VVC 152, the switching frequency and the inductance value of the inductor 214 may be selected to satisfy a maximum allowable ripple current magnitude. The ripple component may be a periodic variation that appears on a DC signal. The ripple component may be defined by a ripple component magnitude and a ripple component frequency. The ripple component may have harmonics that are in an audible frequency range that may add to the noise signature of the vehicle. Further, the ripple component may cause difficulties with accurately controlling devices fed by the source. During switching transients, the switching devices 206, 208 may turn off at the maximum inductor current (DC current plus ripple current) which may cause large voltage spike across the switching devices 206, 208. Because of size and cost constraints, the inductance value may be selected based on the conducted current. In general, as current increases the inductance may decrease due to saturation.

The switching frequency may be selected to limit a magnitude of the ripple current component under worst case scenarios (e.g., highest input current and/or duty cycle close to 50% conditions). The switching frequency of the switching devices 206, 208 may be selected to be a frequency (e.g., 10 kHz) that is greater than a switching frequency of the motor/generator inverter (e.g., 5 kHz) that is coupled to an output of the VVC 152. In some applications, the switching frequency of the VVC 152 may be selected to be a predetermined fixed frequency. The predetermined fixed frequency is generally selected to satisfy noise and ripple current specifications. However, the choice of the predetermined fixed frequency may not provide best performance over all operating ranges of the VVC 152. The predetermined fixed frequency may provide best results at a particular set of operating conditions, but may be a compromise at other operating conditions.

Increasing the switching frequency may decrease the ripple current magnitude and lower voltage stress across the switching devices 206, 208, but may lead to higher switching losses. While the switching frequency may be selected for worst case ripple conditions, the VVC 152 may only operate under the worst case ripple conditions for a small percentage of the total operating time. This may lead to unnecessarily high switching losses that may lower fuel economy. In addition, the fixed switching frequency may concentrate the noise spectrum in a very narrow range. The increased noise density in this narrow range may result in noticeable noise, vibration, and harshness (NVH) issues.

The VVC controller 200 may be programmed to vary the switching frequency of the switching devices 206, 208 based on the duty cycle and the input current. The variation in switching frequency may improve fuel economy by reducing switching losses and reduce NVH issues while maintaining ripple current targets under worst case operating conditions.

During relatively high current conditions, the switching devices 206, 208 may experience increased voltage stress. At a maximum operating current of the VVC 152, it may be desired to select a relatively high switching frequency that reduces the ripple component magnitude with a reasonable level of switching losses. The switching frequency may be selected based on the input current magnitude such that as the input current magnitude increases, the switching frequency increases. The switching frequency may be increased up to a predetermined maximum switching frequency. The predetermined maximum switching frequency may be a level that provides a compromise between lower ripple component magnitudes and higher switching losses. The switching frequency may be changed in discrete steps or continuously over the operating current range.

The VVC controller 200 may be programmed to reduce the switching frequency in response to the current input being less than a predetermined maximum current. The predetermined maximum current may be a maximum operating current of the VVC 152. The change in the switching frequency may be based on the magnitude of the current input to the switching devices 206, 208. When the current is greater than the predetermined maximum current, the switching frequency may be set to a predetermined maximum switching frequency. As the current decreases, the magnitude of the ripple component decreases. By operating at lower switching frequencies as the current decreases, switching losses are reduced. The switching frequency may be varied based on the power input to the switching devices. As the input power is a function of the input current and the battery voltage, the input power and input current may be used in a similar manner.

Since the ripple current is also affected by the duty cycle, the switching frequency may be varied based on the duty cycle. The duty cycle may be determined based on a ratio of the input voltage to the output voltage. As such, the switching frequency may also be varied based on the ratio between the input voltage and the output voltage. When the duty cycle is near 50%, the predicted ripple current magnitude is a maximum value and the switching frequency may be set to the predetermined maximum frequency. The predetermined maximum frequency may be a maximum switching frequency value that is selected to minimize the ripple current magnitude. The switching frequency may be changed in discrete steps or continuously over the duty cycle range.

The VVC controller 200 may be programmed to reduce the switching frequency from the predetermined maximum frequency in response to a magnitude of a difference between the duty cycle and the duty cycle value (e.g, 50%) at which the predicted ripple component magnitude is a maximum. When the magnitude of the difference is less than a threshold, the switching frequency may be set to the predetermined frequency. When the magnitude of the difference decreases, the switching frequency may be increased toward the predetermined maximum frequency to reduce the ripple component magnitude. When the magnitude of the difference is less than a threshold, the switching frequency may be set to the predetermined maximum frequency.

The switching frequency may be limited to be between the predetermined maximum frequency and a predetermined minimum frequency. The predetermined minimum frequency may be a frequency level that is greater than a predetermined switching frequency of the power electronic module 126 that is coupled to an output of the variable voltage converter 152. The switching frequency may also be based on parasitic inductance associated with the gate of the IGBT.

Figure 3:
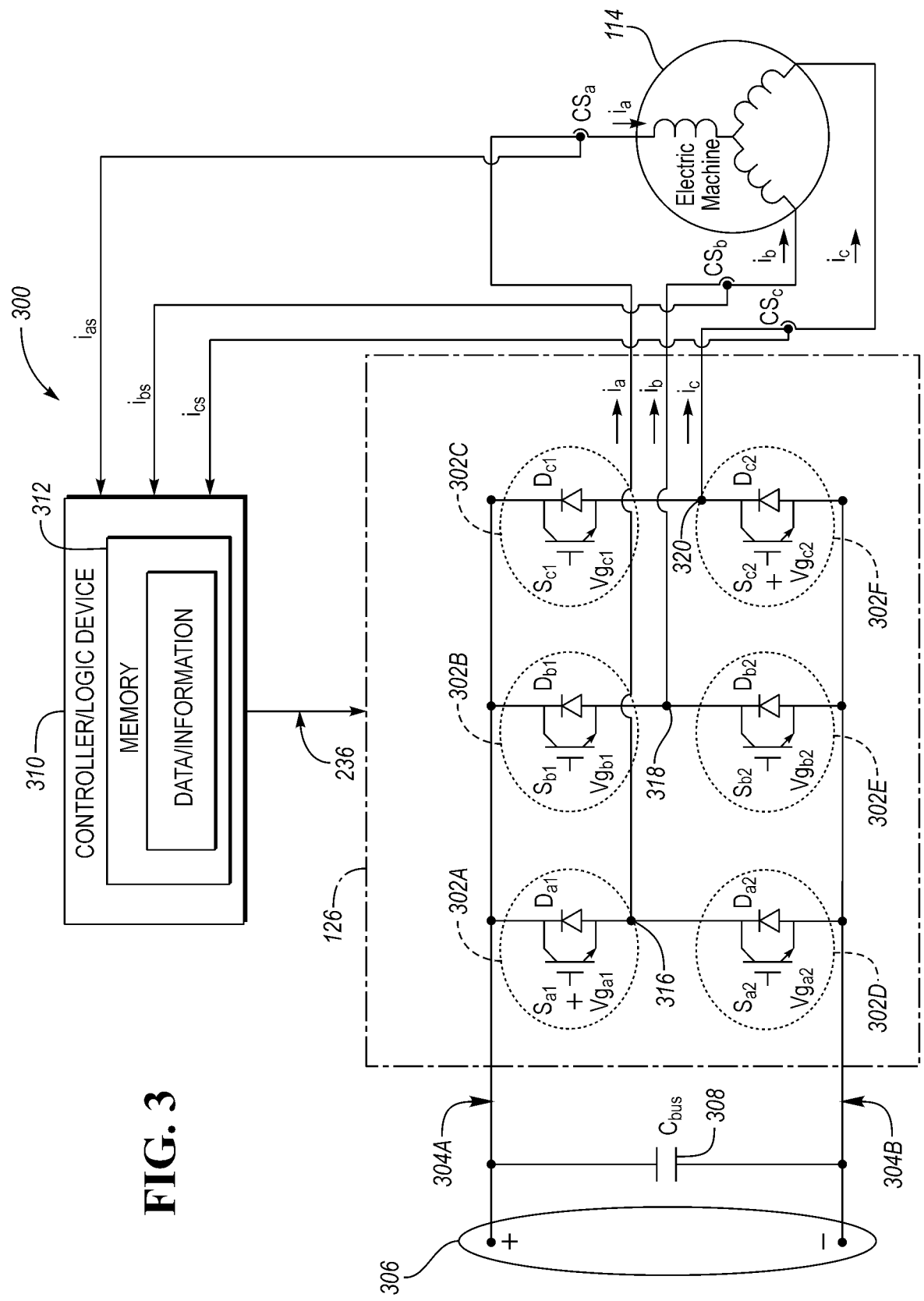
FIG. 3 is a schematic diagram of a vehicular electric machine inverter.

With reference to FIG. 3, a system 300 is provided for controlling a power electronics module (PEM) 126. The PEM 126 of FIG. 3 is shown to include a plurality of switches 302 (e.g., IGBTs) configured to collectively operate as an inverter with first, second, and third phase legs 316, 318, 320. While the inverter is shown as a three-phase converter, the inverter may include additional phase legs. For example, the inverter may be a four-phase converter, a five-phase converter, a six-phase converter, etc. In addition, the PEM 126 may include multiple converters with each inverter in the PEM 126 including three or more phase legs. For example, the system 300 may control two or more inverters in the PEM 126. The PEM 126 may further include a DC to DC converter having high power switches (e.g., IGBTs) to convert a power electronics module input voltage to a power electronics module output voltage via boost, buck or a combination thereof.

As shown in FIG. 3, the inverter may be a DC-to-AC converter. In operation, the DC-to-AC converter receives DC power from a DC power link 306 through a DC bus 304 and converts the DC power to AC power. The AC power is transmitted via the phase currents ia, ib, and ic to drive an AC machine also referred to as an electric machine 114, such as a three-phase permanent-magnet synchronous motor (PMSM) as depicted in FIG. 3. In such an example, the DC power link 306 may include a DC storage battery to provide DC power to the DC bus 304. In another example, the inverter may operate as an AC-to-DC converter that converts AC power from the AC machine 114 (e.g., generator) to DC power, which the DC bus 304 can provide to the DC power link 306. Furthermore, the system 300 may control the PEM 126 in other power electronic topologies.

With continuing reference to FIG. 3, each of the phase legs 316, 318, 320 in the inverter includes power switches 302, which may be implemented by various types of controllable switches. In one embodiment, each power switch 302 may include a diode and a transistor, (e.g., an IGBT). The diodes of FIG. 3 are labeled $D_{a1}$, $D_{a2}$, $D_{b1}$, $D_{b2}$, $D_{c1}$, and $D_{c2}$ while the IGBTs of FIG. 3 are respectively labeled $S_{a1}$, $S_{a2}$, $S_{b1}$, $S_{b2}$, $S_{c1}$, and $S_{c2}$. The power switches $S_{a1}$, $S_{a2}$, $D_{a1}$, and $D_{a2}$ are part of phase leg A of the three-phase converter, which is labeled as the first phase leg A 316 in FIG. 3. Similarly, the power switches $S_{b1}$, $S_{b2}$, $D_{b1}$, and $D_{b2}$ are part of phase leg B 318 and the power switches $S_{c1}$, $S_{c2}$, $D_{c1}$, and $D_{c2}$ are part of phase leg C 320 of the three-phase converter. The inverter may include any number of the power switches 302 or circuit elements depending on the particular configuration of the inverter. The diodes ($D_{xx}$) are connected in parallel with the IGBTs ($S_{xx}$) however, as the polarities are reversed for proper operation, this configuration is often referred to as being connected anti-parallel. A diode in this anti-parallel configuration is also called a freewheeling diode.

As illustrated in FIG. 3, current sensors $CS_a$, $CS_b$, and $CS_c$ are provided to sense current flow in the respective phase legs 316, 318, 320. FIG. 3 shows the current sensors $CS_a$, $CS_b$, and $CS_c$ separate from the PEM 126. However, current sensors $CS_a$, $CS_b$, and $CS_c$ may be integrated as part of the PEM 126 depending on its configuration. Current sensors $CS_a$, $CS_b$, and $CS_c$ of FIG. 3 are installed in series with each of phase legs A, B and C (i.e., phase legs 316, 318, 320 in FIG. 3) and provide the respective feedback signals $i_{as}$, $i_{bs}$, and $i_{cs}$ (also illustrated in FIG. 3) for the system 300. The feedback signals $i_{as}$, $i_{bs}$, and $i_{cs}$ may be raw current signals processed by logic device (LD) 310 or may be embedded or encoded with data or information about the current flow through the respective phase legs 316, 318, 320. Also, the power switches 302 (e.g., IGBTs) may include current sensing capability. The current sensing capability may include being configured with a current mirror output, which may provide data/signals representative of $i_{as}$, $i_{bs}$, and $i_{cs}$. The data/signals may indicate a direction of current flow, a magnitude of current flow, or both the direction and magnitude of current flow through the respective phase legs A, B, and C.

Referring again to FIG. 3, the system 300 includes a logic device (LD) or controller 310. The controller or LD 310 can be implemented by various types or combinations of electronic devices and/or microprocessor-based computers or controllers. To implement a method of controlling the PEM 126, the controller 310 may execute a computer program or algorithm embedded or encoded with the method and stored in volatile and/or persistent memory 312. Alternatively, logic may be encoded in discrete logic, a microprocessor, a microcontroller, or a logic or gate array stored on one or more integrated circuit chips. As shown in the embodiment of FIG. 3, the controller 310 receives and processes the feedback signals $i_{as}$, $i_{bs}$, and $i_{cs}$ to control the phase currents $i_a$, $i_b$, and $i_c$ such that the phase currents $i_a$, $i_b$, and $i_c$ flow through the phase legs 316, 318, 320 and into the respective windings of the electric machine 114 according to various current or voltage patterns. For example, current patterns can include patterns of phase currents $i_a$, $i_b$, and $i_c$ flowing into and away from the DC-bus 304 or a DC-bus capacitor 308. The DC-bus capacitor 308 of FIG. 3 is shown separate from the PEM 126. However, the DC-bus capacitor 308 may be integrated as part of the PEM 126.

As shown in FIG. 3, a storage medium 312 (hereinafter "memory"), such as computer-readable memory may store the computer program or algorithm embedded or encoded with the method. In addition, the memory 312 may store data or information about the various operating conditions or components in the PEM 126. For example, the memory 312 may store data or information about current flow through the respective phase legs 316, 318, 320. The memory 312 can be part of the controller 310 as shown in FIG. 3. However, the memory 312 may be positioned in any suitable location accessible by the controller 310.

As illustrated in FIG. 3, the controller 310 transmits at least one control signal 236 to the power converter system 126. The power converter system 126 receives the control signal 322 to control the switching configuration of the inverter and therefore the current flow through the respective phase legs 316, 318, and 320. The switching configuration is a set of switching states of the power switches 302 in the inverter. In general, the switching configuration of the inverter determines how the inverter converts power between the DC power link 306 and the electric machine 114.

To control the switching configuration of the inverter, the inverter changes the switching state of each power switch 302 in the inverter to either an ON state or an OFF state based on the control signal 322. In the illustrated embodiment, to switch the power switch 302 to either ON or OFF states, the controller/LD 310 provides the gate voltage (Vg) to each power switch 302 and therefore drives the switching state of each power switch 302. Gate voltages $Vg_{a1}$, $Vg_{a2}$, $Vg_{b1}$, $Vg_{b2}$, $Vg_{c1}$, and $Vg_{c2}$ (shown in FIG. 3) control the switching state and characteristics of the respective power switches 302. While the inverter is shown as a voltage-driven device in FIG. 3, the inverter may be a current-driven device or controlled by other strategies that switch the power switch 302 between ON and OFF states. The controller 310 may change the gate drive for each IGBT based on the rotational speed of the electric machine 114, the mirror current, or a temperature of the IGBT switch. The change in gate drive may be selected from a plurality of gate drive currents in which the change gate drive current is proportional to a change in IGBT switching speed.

As also shown in FIG. 3, each phase leg 316, 318, and 320 includes two switches 302. However, only one switch in each of the legs 316, 318, 320 can be in the ON state without shorting the DC power link 306. Thus, in each phase leg, the switching state of the lower switch is typically opposite the switching state of the corresponding upper switch. The top switches are typically referred to as high-side switches (i.e., 302A, 302B, 302C) and the lower switches are typically referred to as low-side switches (i.e., 302D, 302E, 302F). Consequently, a HIGH state of a phase leg refers to the upper switch in the leg in the ON state with the lower switch in the OFF state. Likewise, a LOW state of the phase leg refers to the upper switch in the leg in the OFF state with the lower switch in the ON state. As a result, IGBTs with current mirror capability may be on all IGBTs, a subset of IGBTs (e.g., $S_{a1}$, $S_{b1}$, $S_{c1}$) or a single IGBT.

Two situations can occur during an active state of the three-phase converter example illustrated in FIG. 3: (1) two phase legs are in the HIGH state while the third phase leg is in the LOW state, or (2) one phase leg is in the HIGH state while the other two phase legs are in the LOW state. Thus, one phase leg in the three-phase converter, which may be defined as the "reference" phase for a specific active state of the inverter, is in a state opposite to the other two phase legs, or "non-reference" phases, that have the same state. Consequently, the non-reference phases are either both in the HIGH state or both in the LOW state during an active state of the inverter.

Figure 4:
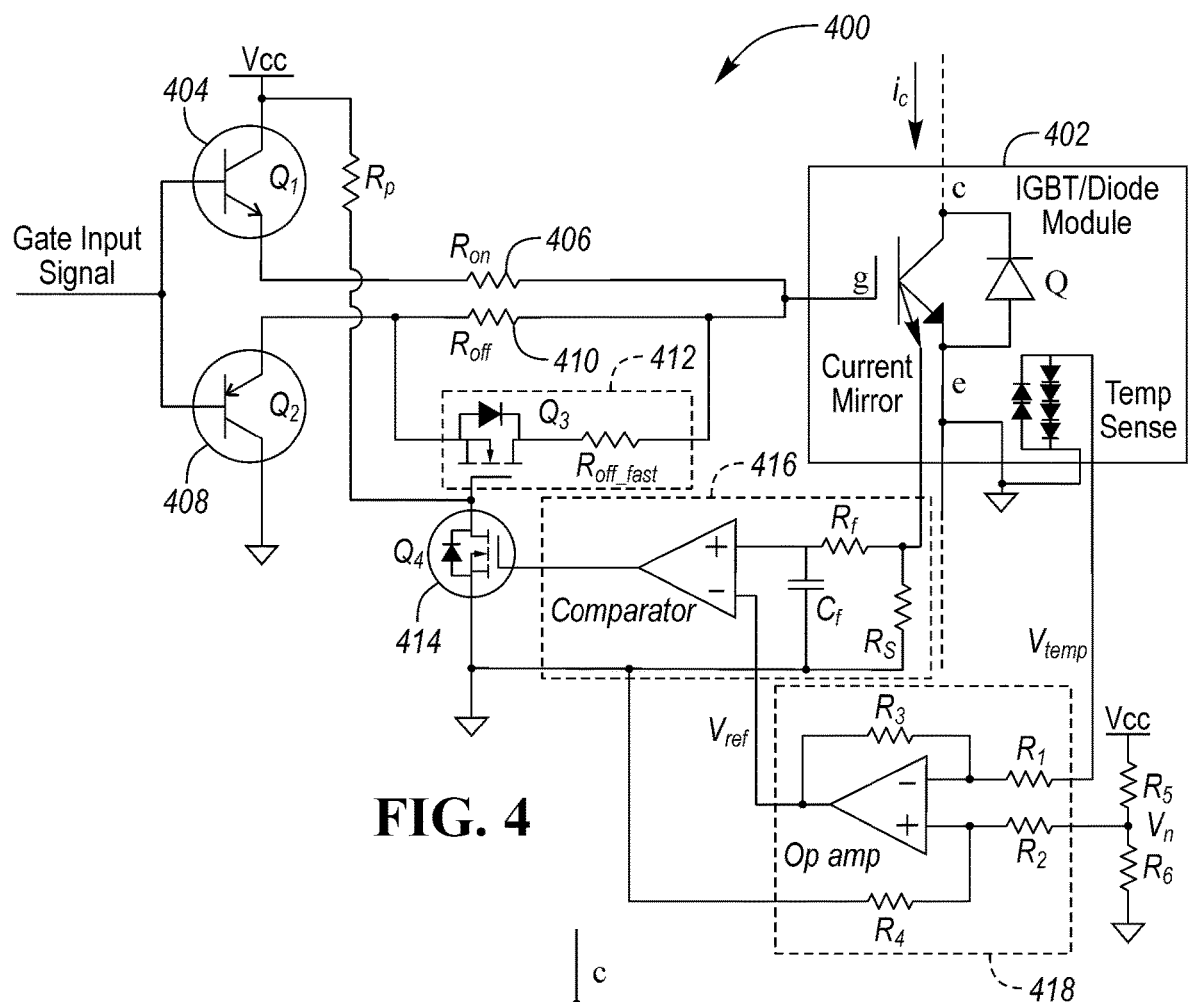
FIG. 4 is a schematic diagram of a gate drive circuit having temperature compensation circuitry.

FIG. 4 is a schematic diagram of a gate drive circuit having temperature compensation circuitry. Typically, a conventional gate driver circuit used to drive an IGBT may include a buffer stage, a turn-on resistor and a turn-off gate resistor. The gate driver typically receives a gate input signal from micro-processor and the output(s) is/are connected to a gate of the IGBT. The gate input signal from the micro-processor may be amplified by a buffer stage composed of switches (e.g., BJTs or MOSFETs). When the gate input signal is high, a high-side switch is turned on and a current flows from gate driver power supply, e.g. 15V, through a turn-on gate resistor Ron to the gate. When gate input signal is low, the gate is discharged through a turn-off gate resistor Roff and a low-side switch such that Ron and Roff determine the IGBT turn-on and turn-off switching speed respectively.

A typical turn-off transient typically includes four phases, a turn-off delay phase, a Vce rising period, an Ic falling period, and a Vge discharge to zero period. First, the turn-off delay phase is when the turn-off process begins, the gate voltage (Vge) starts to decrease, however, before Vge reaches the miller plateau voltage of the device, the IGBT collector-emitter voltage (Vce) and collector current (Ic) remain essentially constant. The turn-off delay phase is directly related to a dead-time in that the larger the turn-off delay phase is, the larger a dead-time is needed to avoid potential shoot-through between a high-side and low-side switch. However, a large dead-time could degrade a traction inverter output quality. The second phase is a Vce rising period in which Vce reaches a dc link voltage at the end of this phase. During the third phase, Ic starts to decrease because of stray inductance in the power circuit, in which a di/dt causes a surge voltage across the IGBT. Therefore, as Vce continues to increase exceeding the dc link voltage, due to the Vce surge voltage, the corresponding IGBT voltage rating requirement must also increase. In the fourth phase, Vge discharges to zero producing a tail current.

When designing a conventional gate driver for a EV/HEV traction inverter or a EV/HEV DC-DC converter, a designer typically considers tradeoffs between switching losses and device stresses. For example, the gate resistances are selected using worst case scenarios, (e.g., maximum load current and maximum dc bus voltage), to guarantee that a device peak surge voltage is always below its rated limits. This typically leads to a selection of large gate resistances. However, the selected large gate resistors may result in unnecessarily slow switching speeds during low current operation. A traction inverter mainly operates at low current levels during typical driving cycles, thus the overall vehicle fuel economy is sacrificed when the system is designed to meet the worst case requirements.

Here, a proposed gate driver circuit actively adjusts a turn-off switching speed based on different current levels and different device junction temperatures. The circuit shown in FIG. 4 utilizes a current sensing pin (e.g., current mirror pin) of an IGBT to operate hybrid vehicle powertrain systems (e.g., a DC-DC converter/VVC or a traction inverter). During operation when the load current and thus the mirror current is low, the gate driver increases a switching speed to minimize losses. The gate driver can also, under worst cases, maintain a maximum surge voltage to a value of a conventional gate driver. The circuit is further configured to compensate the switching speed and maximum surge voltage based on an impact of a junction temperature on the current mirror characteristics by applying negative feedback from the monolithically integrated (i.e., on-chip) temperature sensor.

FIG. 4 is a schematic diagram of a gate drive circuit 400 having temperature compensation circuitry. The gate driver circuit 400 drives a gate of an IGBT 402 that has a current mirror and temperature sensor array. The gate driver circuit 400 includes a pull-up switch 404 that flows a current onto the gate of the IGBT 402 via an on-resistor (Ron) 406 and a pull-down switch 408 that flows a current onto the gate of the IGBT 402 via an off-resistor (Roff) 410. The pull-up switch 404 may be a solid state device (SSD) such as a metal oxide semiconductor field effect transistor (MOSFET), bipolar junction transistor (BJT), an insulated gate bipolar junction transistor (IGBT) or other type of common gate drive switch. In parallel with Roff 410 is a fast turn-off structure 412 which increases a current flowing from the gate during turn-off. The fast turn-off structure 412 shown includes a fast turn-off resistor (Roff_fast) and a series switch (e.g., MOSFET) The control of the series gate is performed by a control switch 414 (e.g., MOSFET) that is driven by an open-loop filtering comparator 416 that is adjusted by negative feedback from a differential amplifier 418 having an output that is inversely proportional to a difference between the output of the on-chip sensor and a reference voltage.

The current mirror structure of the IGBT 402 is typically a mirror IGBT monolithically integrated device that flows a fractional value of the IGBT collector current $i_c$. The current mirror output is normally used to detect over-current and/or short circuit conditions. Here, the current mirror output is used to actively control the turn-off speed of the IGBT. When the current level $i_c$ is low, a fast turn-off is enabled. When the current level $i_c$ is high, the fast turn-off is disabled. To achieve fast turn-off under low current conditions, the fast gate discharge path using the fast turn-off structure 412 that includes the switch (i.e., MOSFET Q3) and a turn-off resistor Roff_fast is enabled using switch 414. Switch 414 is controlled by the open-loop filtering comparator 416 which is based on an output of the current mirror sensing pin that is connected to a sensing resistor Rs to convert the current signal to a voltage signal. As the current mirror signal may have spikes during IGBT 402 switching transients, an RC filter may be used to filter the noise. Here, a filter is formed by Rf and Cf is a low pass filter in which the filter rolls off at a frequency based on the frequency response of the capacitor, in other embodiments, the use of a stop band filter may be used. The output of the RC filter is compared with a reference voltage Vref that corresponds to a current level threshold. When the current is lower than the threshold, the comparator outputs low signal such that MOSFET Q4 is turned off and Q3 gate is pulled up by the Vcc power supply. Enabling the discharge of the gate of the IGBT 402 through fast discharge path 412. When the current of the IGBT 402 exceeds a threshold such that the output of the RC filter is greater than Vref, Q4 is turned on and the gate of Q3 is pulled down to ground disabling the fast discharge path 412. When the fast discharge path 412 is disabled, the gate of IGBT 402 can only be discharged through Roff. Prior to the turn-off event, current flowing through the current mirror pin of IGBT 402 charges capacitor Cf that holds the voltage until the end of the switching transient.

Typically, the current mirror sensor is a small IGBT that is monolithically integrated with the main IGBT (i.e., on-chip or single chip), Therefore characteristics of the current mirror sensor is impacted by changes of temperatures of the small IGBT and the main IGBT. When a constant Vref is used as an input to the filtering comparator 416, the mirror current threshold that is used to enable or disable the fast switching circuit 412 will be vary with changes in temperature (e.g., will be different at different temperatures).

FIG. 5 is a schematic diagram of an insulated gate bipolar junction transistor (IGBT) circuit with a main IGBT 502, a current mirror IGBT 504 and sense resistor 506. Here, the internal schematic of a IGBT device 500 having a main IGBT 502 and a mirror IGBT 504 connected in parallel. The emitter pin of mirror IGBT 504 is connected to a sensing resistor (Rs) 506. When a voltage across Rs (i.e., VRs), reaches Vref, the current flowing through mirror current imirror can be represented by equation 1 shown below:

$$i_{mirror\_threshold} = V_{ref}/R_s. \tag{1}$$

Figure 6:
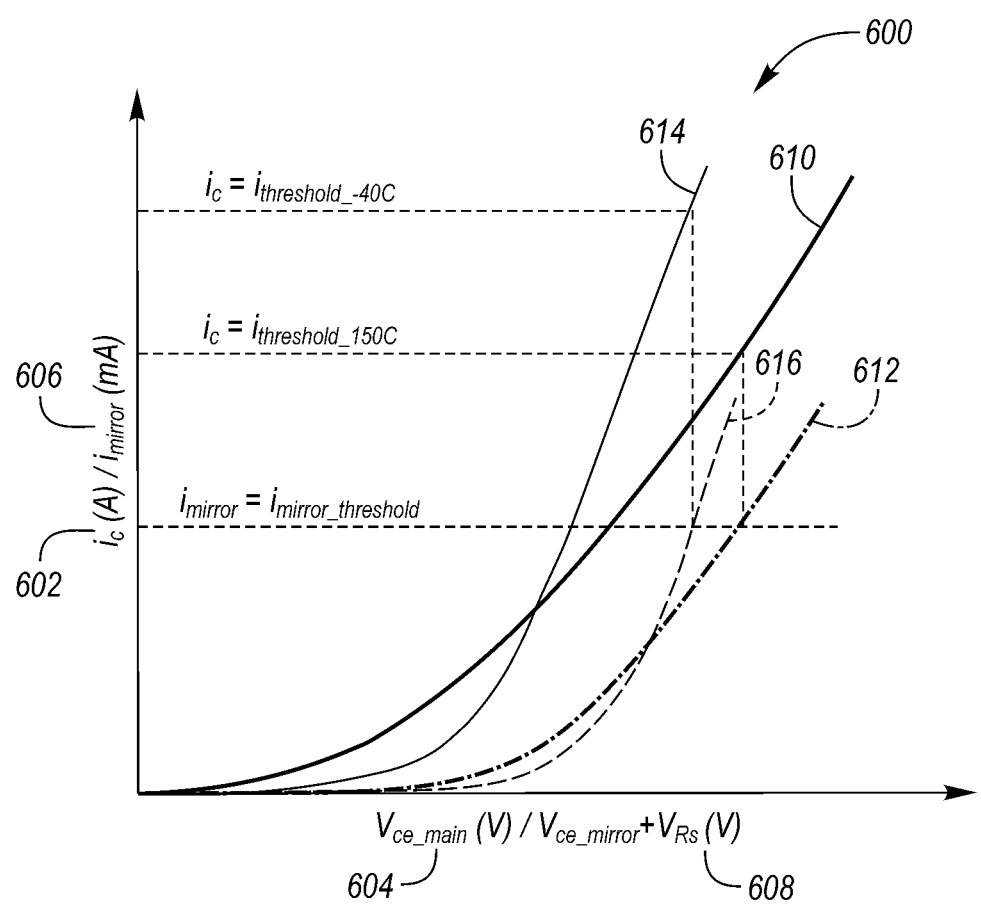
FIG. 6 is a graphical illustration of a collector current with respect to a voltage across a collector and emitter of an IGBT and a mirror current with respect to a voltage across a collector and emitter of a mirror device that is monolithically integrated with the IGBT.

FIG. 6 is a graphical illustration 600 of a collector current 602 with respect to a voltage across a collector and emitter of an IGBT 604 and a mirror current 606 with respect to a voltage across a collector and emitter of a mirror device 608, in which the mirror device is monolithically integrated with the IGBT. This illustration displays Vce vs ic 610 curves and Vce_mirror+VRs vs imirror 612 curves at 150° C. with Vce vs ic 614 curves and Vce_mirror+VRs vs imirror 616 curves at −40° C. At a given Vce_mirror+VRs corresponding to a Vce, an imirror_threshold will correspond to different ic current thresholds at −40 C and 150 C. These different current thresholds are shown as ithreshold_−40 C and ithreshold_150 C respectively. IGBTs typically have a positive temperature coefficient, in which at increased temperatures, the turn-on voltage decreases, thus increasing the collector to emitter current and thereby the voltage Vce. At high current levels, ithreshold_−40 C is greater than ithreshold_150 C as illustrated in the FIG. 6.

Applying this to a traditional gate drive circuit, the circuit would disable the fast switching at a higher current level when the temperature is lower. The operation of the traditional gate drive circuit is not preferable as at higher current levels a turn-off di/dt (e.g., surge voltage) may be higher. Moreover, a device breakdown voltage is lower at lower temperature. To compensate for the temperature impact on the mirror IGBT's characteristics, the circuit from FIG. 4 adjusts Vref for different temperatures. And specifically lowers Vref at lower temperature that leads to lower a current threshold at lower temperature.

The gate driver of FIG. 4 introduces extra functionality to compensate for a change in device junction temperature. The temperature compensation circuit includes an on-die temperature sensor (e.g., diode array), an operational amplifier, and a few resistors (e.g., R1-R6). The voltage level of Vref is determined by the temperature compensation circuit (e.g., 418). The output level of the on-chip temperature sensor (e.g., Vtemp) typically varies from 0 to 5V, in which 0V corresponds to highest temperature and 5V corresponds to lowest temperature. The operational amplifier and resistors (R1-R6) are used to scale the output of the temperature sensor from 0-5V to Vref that is values corresponding to different is current thresholds. Here, the resistance of R1 is equal to that of R2, and the resistance of R3 is equal to that of R4 such that Vref may be calculated as follows.

$$V_{ref} = (R_3/R_1) \times (V_n - V_{temp}) \quad (2)$$

The resistors R5 and R6 form a voltage divider to produce Vn, (e.g., Vn=10V). A small ratio of R3 with respect to R1 is desirable, for example, R3/R1=0.04. This would result in an implementation which may be represented as Vref=(R3/R1)×(Vn−Vtemp)=0.04×(10V−Vtemp). In this implementation for example, When Vtemp=0 @ 150 C and Vtemp=5V @−40 C, we get Vref=0.4V @ 150 C and 0.2V @−40 C, thus Vref is lower at low temperature as desired.

Figure 7:
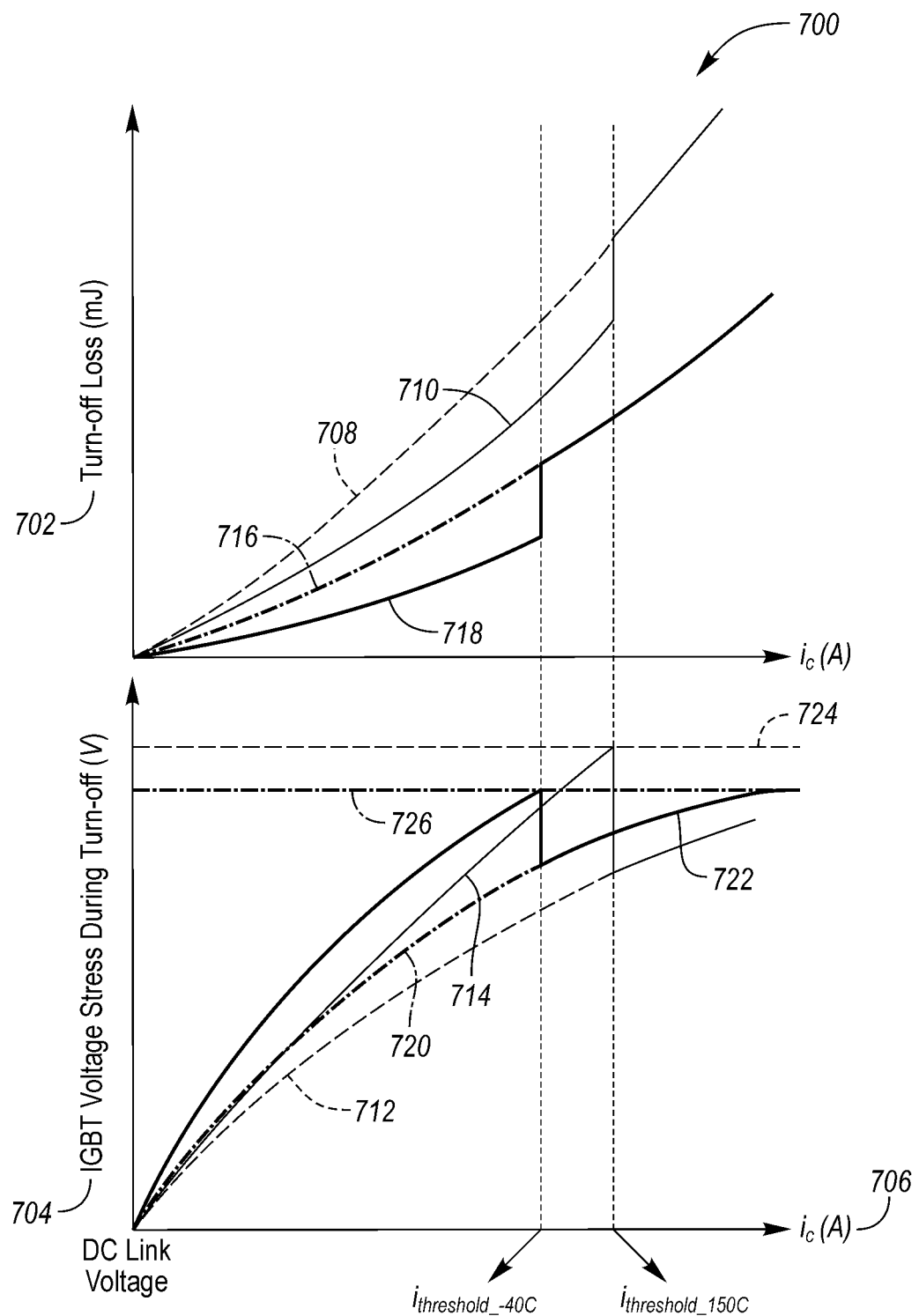
FIG. 7 is a graphical illustration of turn-off loss and voltage stress of an IGBT with respect to a collector current of the IGBT.

FIG. 7 is a graphical illustration 700 of turn-off loss and voltage stress of an IGBT with respect to a collector current of the IGBT. The turn-off loss and IGBT voltage stress data at different currents and different temperatures for both an embodiment of this disclosed method and a conventional method are provided in FIG. 7. Here it is shown that the turn-off switching losses of the proposed method are lower than those of the conventional method when current is below ithreshold_−40 C and ithreshold_150 C at −40 C and 150 C respectively. It is because fast turn-off is enabled. When current increases above the threshold, the turn-off losses are the same for two methods. It is also noticed that ithreshold_−40 C is smaller than ithreshold_150 C thanks to the temperature compensation circuit.

The IGBT voltage stress during turn-off transient equals to DC link voltage plus the turn-off surge voltage. When current is below the threshold, because fast turn-off is enabled, the surge voltage (also IGBT voltage stress) are higher for the proposed method. When current is above the threshold, the surge voltage is the same for two methods. For conventional method, the peak IGBT voltage stress at max load current is equal/close to IGBT breakdown voltage at −40 C condition (some margin may be reserved). Because di/dt at high temperature is usually lower than di/dt at low temperature, the peak IGBT voltage stress at max load current at 150 C is lower than the stress at −40 C. It is seen that the higher breakdown voltage at 150 C is not fully utilized. For the proposed method, when temperature is at −40 C, the surge voltage at ithreshold_−40 C is equal to the value at max load current, which is also same/close to the breakdown voltage at that temperature. When temperature is at 150 C, the surge voltage at ithreshold_150 C is increased to the breakdown voltage. It means the device voltage rating is fully utilized to minimize switching losses.

The proposed method can also be applied for turn-on improvement.

Advantages of this solution include lower switching losses with increased reliability while avoiding a power device voltage breakdown at low temperatures. This also may be accomplished with an adjustable temperature compensated turn-off gate driver. The adjustability accounts for a change in the breakdown voltage of the power devices for the xEVs even at extreme low operating temperatures (e.g. at −40° C.). However, when operating in a high temperature range, the system adjusts for the increased breakdown voltage of the selected power device as it is much higher than the low temperature requirement. A device with higher breakdown voltage typically has a higher conduction loss. By using the proposed adjustable turn-off gate drive based on the xEVs operation temperature, the device voltage peak is optimized within a wide temperature range. As a result, power devices with reduced voltage rating may be safely used for the same application thereby reducing conduction loss. Also, the proposed method uses an output of the temperature sensing diode which is already used for temperature monitoring and over temperature protection in xEVs. Therefore, additional sensing circuits/components are typically not needed. Lastly, the proposed method has minimum additional components to the existing gate drive schematics. As a result the proposed method can be used for any gate drive strategy including the voltage source gate drive, the current source gate drive, etc., and the original gate drive function will not be affected.

As shown above, at high operation temperatures the proposed system may increase the turn-off speed and reduce the turn-off losses. As most of an xEV is operated in this range, the power devices in xEVs will work at these high temperature range, thereby improving fuel economy of the vehicle.

Control logic or functions performed by controller may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but are provided for ease of illustration and description. The control logic may be implemented primarily in software executed by a microprocessor-based vehicle, engine, and/or powertrain controller, such as controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to, cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle powertrain comprising:
 a monolithically integrated load switch, mirror switch, and temperature array;
 an off-resistor connected to the load switch;
 a fast turn-off structure configured to connect in parallel with the off-resistor to provide a fast gate discharge path; and
 a gate driver including
  a first comparator coupled to the fast turn-off structure and configured to filter a current level of the mirror switch, and
  a second comparator configured to provide a reference to the first comparator based on temperature array output such that a gate discharge rate of the load switch, enabled by the first comparator and at least one of the off-resistor and the fast turn-off structure, varies proportionally with a temperature adjusted filtered current level.

2. The vehicle powertrain of claim 1, wherein the load switch and the mirror switch are Metal Oxide Semiconductor Field Effect Transistors (MOSFETs) or Insulated Gate Bipolar Junction Transistors (IGBTs).

3. The vehicle powertrain of claim 1, wherein the rate of discharge is proportional to a change in the filtered current level.

4. The vehicle powertrain of claim 1 wherein the load switch is in a DC-AC converter and configured to flow a current in an electric machine proportional to the current level of the mirror switch, and the filter is over a window that is greater than a predetermined shut-off time.

5. The vehicle powertrain of claim 1, wherein the load switch is in a DC-DC converter and configured to flow a current in a boost inductor configured to increase a battery voltage to drive an electric machine, and the filter is over a window that is greater than a predetermined shut-off time.

6. A method of controlling a switch comprising:
 filtering a mirror current indicative of a current flow through the switch;
 varying a reference voltage proportionally with a junction temperature of the switch; and
 varying a discharge rate of a gate of the switch based on an open loop comparison of the filtered mirror current with the varied reference voltage such that the discharge rate decreases upon reaching a breakdown threshold of the switch.

7. The method of claim 6, wherein the switch is a Metal Oxide Semiconductor Field Effect Transistor (MOSFET) or an Insulated Gate Bipolar Junction Transistor (IGBT).

8. The method of claim 6, wherein the breakdown threshold is associated with a breakdown voltage of the switch.

9. The method of claim 6, wherein the discharge rate is varied proportionally to a change in the filtered mirror current.

10. The vehicle powertrain of claim 1, further comprising:
 a control switch connected between the first comparator and the fast turn-off structure and configured to enable the fast gate discharge path in response to the temperature adjusted filtered current level being less than a threshold value.

11. The vehicle powertrain of claim 10, wherein the fast turn-off structure further comprises a series switch and a fast turn-off resistor.

12. The vehicle powertrain of claim 11, wherein closing the series switch adds resistance from the fast turn-off resistor in parallel with the off-resistor thereby increasing the gate discharge rate, and opening the series switch removes the resistance from the fast turn-off resistor thereby decreasing the gate discharge rate.

13. The vehicle powertrain of claim 12 wherein the output of the first comparator is inversely proportional to a difference between an output of the temperature array an output of the second comparator.

14. The vehicle powertrain of claim 12 further comprising at least one of a resistor and a capacitor connected between the load switch and the first comparator for filtering the current signal of the mirror switch.

15. A vehicle powertrain comprising:
- a gate drive circuit having an on-resistor and an off-resistor;
- an insulated-gate bipolar transistor (IGBT), including signal gate, a mirror output, and a temperature array;
- a turn-off structure having a fast turn-off resistor and a series switch, wherein closing the series switch adds resistance from the fast turn-off resistor to the gate drive circuit, parallel to the off-resistor thereby increasing a discharge rate of the signal gate, and wherein opening the series switch removes resistance from the fast turn-off resistor from the gate drive circuit thereby decreasing a discharge rate of the signal gate;
- a second comparator capable of receiving a temperature voltage from the temperature array; and
- a first comparator capable of receiving a temperature compensated voltage signal from the second comparator and receiving a filtered current level from the mirror output; and
- a control switch configured to close or open the series switch based on the output of the first comparator.

16. The vehicle powertrain of claim 15 wherein the IGBT is in a DC-AC converter and configured to flow a current in an electric machine proportional to the current level of the IGBT, and the filter is over a window that is greater than a predetermined shut-off time.

17. The vehicle powertrain of claim 15 wherein the output of the first comparator is inversely proportional to a difference between the output of the temperature array and the output of the second comparator.

18. The vehicle powertrain of claim 15 further comprising a resistor/capacitor filter disposed between the IGBT and the first comparator for filtering the current signal of the mirror output.

* * * * *